United States Patent [19]

Eckels

[11] 4,319,149
[45] Mar. 9, 1982

[54] SUPERCONDUCTING GENERATOR WITH IMPROVED THERMAL TRANSIENT RESPONSE

[75] Inventor: Phillip W. Eckels, Penn Hills Twp., Allegheny County, Pa.

[73] Assignee: Electric Power Research Institute, Inc., Palo Alto, Calif.

[21] Appl. No.: 143,205

[22] Filed: Apr. 24, 1980

[51] Int. Cl.³ .............................................. H02K 9/00
[52] U.S. Cl. ...................................... 310/52; 310/64; 310/265
[58] Field of Search ..................... 310/64, 261, 10, 52, 310/265, 40 R, 53, 54, 55, 56, 57, 58, 59, 60 R, 60 A, 61, 62, 63

[56] References Cited

U.S. PATENT DOCUMENTS

| | | | |
|---|---|---|---|
| 3,942,053 | 3/1976 | Abolins et al. | 310/52 |
| 4,076,988 | 2/1978 | Litz | 310/52 |
| 4,092,555 | 5/1978 | Ying et al. | 310/52 |
| 4,117,357 | 9/1978 | Baumann | 310/52 |
| 4,120,169 | 10/1978 | Eckels | 62/55 |
| 4,123,676 | 10/1978 | Cooper et al. | 310/52 |
| 4,123,677 | 10/1978 | Laskari's et al. | 310/52 |
| 4,171,494 | 10/1979 | Yamaguchi | 310/52 |

OTHER PUBLICATIONS

ASME Publication, A Helium Cooling System for Large Superconducting A.C. Generators, by P. W. Eckels and A. S. Ying, pp. 1–8, Aug. 1, 1978.

*Primary Examiner*—J. V. Truhe
*Assistant Examiner*—Morris Ginsburg
*Attorney, Agent, or Firm*—William D. Lanyi

[57] ABSTRACT

A rotor for a superconducting generator with improved thermal transient response is disclosed and claimed. In particular, a cylindrical radiation shield disposed about said rotor is given the twin-functions of protecting the rotor from radiant heat from the ambiance, as well as warming the coolant during abnormal operating conditions to ensure minimal damage from thermal transients. Thermohydraulic stabilization of the coolant flow through axial passages in the shield is achieved by the use of risers located within the flow path at the discharge end of the shield.

15 Claims, 8 Drawing Figures

SUPERCONDUCTING GENERATOR WITH IMPROVED THERMAL TRANSIENT RESPONSE

BACKGROUND AND SUMMARY OF THE INVENTION

The present invention relates generally to a superconducting generator's rotor; and more particularly to means for utilizing the rotor's radiation shield as a regenerator by regulating the coolant flow therethrough, and in so doing protecting certain components of the generator during transient conditions.

A typical superconducting generator has a supercooled rotor which includes a superconducting field winding and a structure for supporting the winding. The rotor is supercooled to a cryogenic temperature by a fluid refrigerant, for example liquid helium, which is contained within the rotor. Other conventional components of this generator include a pair of torque tubes respectively connected at their ends to opposite ends of the rotor support structure, a torque tube heat exchanger associated with each torque tube, and a thermal radiation shield which is a cylindrical shield extending coaxially around the rotor.

During normal operation of the generator, the liquid helium within the rotor is reduced to a vapor or gas through boil-off at a relatively low but constant rate. The helium gas is directed to and along the length of each torque tube by its associated heat exchanger. These torque tubes function to transmit torque from the generator driver which is at room temperature to the winding support structure of the rotor which is at liquid helium temperature (about 3.5 to 4.2 degrees Kelvin). At the same time, they limit thermal stresses as well as "cold end heat" leakage due to temperature gradients.

The function of the radiation shield is to intercept heat radiation from its ambient surroundings, which are typically at room temperature, so as to prevent the radiated heat from warming the cryogenic cold zone within the rotor. Thermodynamic considerations have heretofore indicated that a single radiation shield should operate at about 100° K. in order to minimize liquid helium refrigeration costs. However, when one realizes that 100° K. is equal to −280° F., it becomes apparent that the shield itself must be supercooled. A plurality of passageways are therefore provided internally through the shield, and continuous streams of helium gas are applied through these passageways for supercooling the shield.

Where this type of generator is intended for use in power plant applications, it must be designed to survive the most severe operating condition in such a system, specifically the three-phase high-voltage transmission line fault. During such a fault, electromagnetic losses occur in the rotor's field winding, and also in the radiation shield and rotor support structure. This, in turn, causes the liquid helium within the rotor to boil-off at a substantially higher rate which causes the flow rate of the helium gas through the torque-tube heat exchangers to increase substantially, and thereby causes the temperature of the torque tubes to drop significantly. It has been predicted that in such typical superconducting generators, the helium flow rate will be sufficiently high, and the resulting drop in temperatures of the torque tubes will be sufficiently drastic, to cause the torque tubes to possibly fracture under these abnormal operating conditions.

U.S. Pat. No. 4,250,418, issued on Feb. 10, 1981 to the present inventor, assigned to the present assignee, and incorporated by reference herein, discloses two-way use of the radiation shield: (1) to protect the cold zone from radiated heat, and (2) to maintain the temperature of the coolant during fault conditions. The superconducting generator described, like the typical generator previously recited, utilizes a supercooled rotor including a superconducting field winding and support structure and a pair of torque tubes connected to the winding support structure. However, these torque tubes must be constructed of a material having a thermal coefficient of linear expansion which is negligible at or below a predetermined cryogenic temperature. Preferably, one such material is selected from the group consisting of steel, nickel and chromium, each of which has a coefficient of linear expansion which is negligible at and below approximately 100° K. Continuous streams of helium gas are directed adjacent to sections of the torque tubes, via suitable means such as associated torque tube heat exchangers. These streams of helium gas are thereafter directed through the radiation shield via a plurality of channels (discussed below), and back to the torque tubes where they flow adjacent to and along the remaining torque tube sections and finally out to the ambient surroundings where they are brought to room temperature. During normal operation of the superconducting generator the helium gas moves at a predetermined flow rate for maintaining the first torque tube sections at or below 100° K., and the radiation shield at a temperature near 100° K. During abnormal operating conditions the coolant acts as a heat exchanger between the shield and remaining torque tube sections, for transferring heat from the shield to these latter sections. This maintains the temperature of these remaining sections at or above that of the shield, thereby minimizing any drop in temperature and the possibility of damage in the event of a helium flow surge.

The present application discloses an improvement on the aforementioned invention, said improvement directed to means for stabilizing the coolant flow through the shield. The radiation shield includes a plurality of axially-directed cooling passages connected in parallel at either end by peripherally-directed channels. Coolant flow in the axial passages are subject to thermal hydraulic instabilities and therefore requires flow regulation. In accordance with the invention a flow regulator is disposed at the discharge end of each axial passage. The flow regulator is a dam, convection trap, or riser having a predetermined height which provides the desired stabilization of the flow. The necessary height can be calculated from flow equations discussed below. The riser may be a protuberance within each axial passage or may take the form of a radially-directed channel which connects each axial passage with the peripheral discharge channel.

BRIEF DESCRIPTION OF THE DRAWINGS

The invention will be more fully understood from the following detailed description taken in connection with the accompanying drawings, in which.

DETAILED DESCRIPTION OF THE PREFERRED EMBODIMENT

Figure 1:
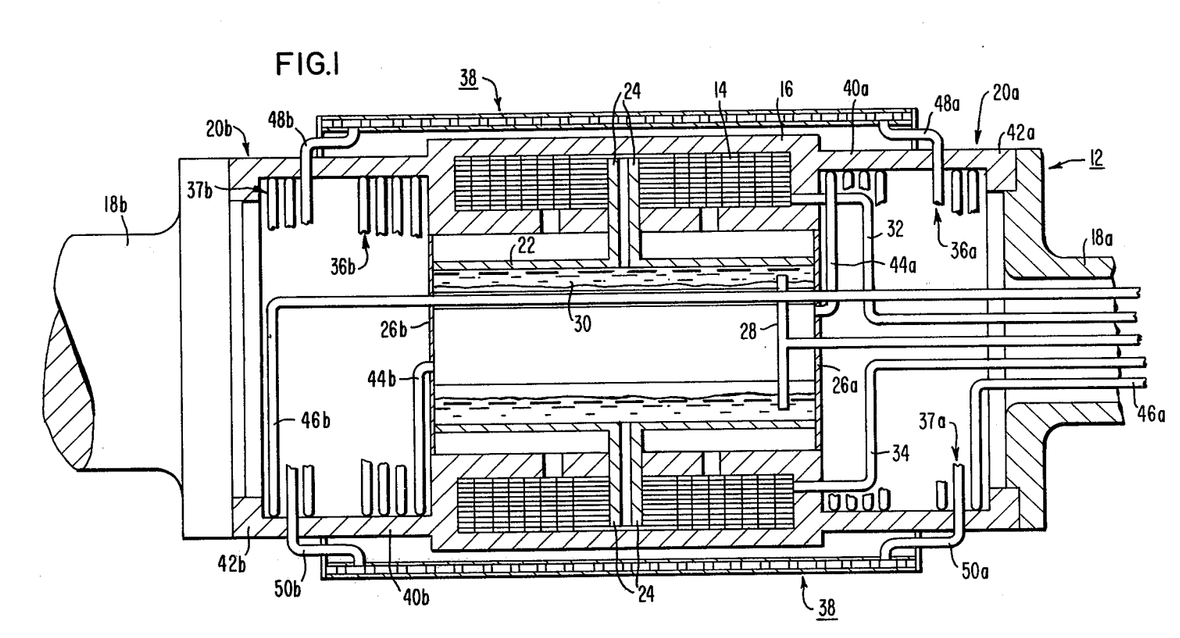
FIG. 1 is a diametrical sectional view of a superconducting generator constructed in accordance with the present invention.

Referring now to the drawings, like components and features are designated by like reference numerals throughout the various figures. Attention is directed specifically to FIG. 1 which illustrates a superconducting generator's rotor constructed in accordance with the present invention and generally designated by the reference numeral 12. The cylindrical supercooled rotor 12 includes a superconducting field winding 14 within a cylindrical winding support structure 16. This entire assembly is fixedly connected at its opposite ends to bearing journals 18a, 18b by means of two cylindrical torque tubes 20a, 20b. As illustrated, these torque tubes 20a, 20b are respectively connected at their ends to opposite ends of the cylindrical support structure 16, and extend coaxially therewith between the support structure and the bearing journals 18a, 18b. An axially-extending feed trough 22 which comprises part of the rotor 12 is located concentrically within the winding support structure 16. The trough 22 includes a pair of spaced-apart, circumferentially-directed heat exchangers 24 which extend through the winding support structure 16 and into the field winding 14. The trough 22 includes two end walls 26a, 26b for closing-off the ends of the trough 22.

As stated above, rotor 12 is supercooled so that its field winding 14 is superconducting. As seen in FIG. 1, this is accomplished by introducing a fluid refrigerant, for example liquid helium, into the inner zone of the rotor, that is, the center of the trough 22, through a suitable conduit 28. The conduit 28 extends through end wall 26a, and branches in a T-shaped manner in directions toward the field winding 14. The other end of the conduit 28 is connected to a suitable liquid helium source through a conventional rotary transfer system (not shown). As the liquid helium passes into this center zone, it forms an inner concentric pool 30 around the inner surface of the trough 22 while continuously feeding directly into the winding 14 through the spaces between heat exchangers 24. The pool 30 of liquid helium is a result of the centrifugal force to which it is subjected as the rotor 12 rotates during operation of the generator. The liquid helium passes into and cools the winding 14 to its own temperature (approximately 3.5–4.2 degrees K.). Other conventional components of the generator include, for example, field leads 32 and 34 and components not shown such as an electromagnetic damper, an overall generator housing, a stator winding and core, and means for directly connecting the generator to a three-phase high-voltage transmission line when the generator is utilized in power plant applications.

The rotor further includes a thermal radiation shield 38, and a torque-tube heat exchanger associated with each of the torque tubes. In addition to their separate independent functions, these components act as a common system for preventing damage to the torque tubes in the event of a three-phase line fault causing abnormal generator operation of the type described previously. The torque-tube heat exchangers which are generally designated at 36a, 37a and 36b, 37b are provided for directing helium gas from the inner zone of the rotor 12 adjacent to and along associated torque tubes 20a,b. The radiation shield 38, cylindrical in construction, is positioned concentrically around rotor 12 and portions of torque tubes 20a and 20b for intercepting heat radiation from its ambient surroundings. The torque tube heat exchangers 36a,b and 37a,b and the radiation shield 38 are also specifically designed to cooperate with each other for protecting the torque tubes against thermal stress during high helium surges by effectively controlling the temperature distribution across each of the torque tubes during normal operation and during this surge period.

As illustrated in FIG. 1, torque-tube heat exchanger 36a is actually a continuous conduit, channel or tubing which extends helically around and against a portion of the inner surface of torque tube 20a from its cryogenic end 40a towards (but stopping short of) its drive end 42a. This helical tubing is interconnected to the inner zone of rotor 12 at its cryogenic end by means of entry conduit 44a. At a predetermined point between the cryogenic end 40a and the drive end 42a, a first bypass tube 48a is provided for connecting the torque tube heat exchanger 36a into shield 38 at one end thereof. The shield 38 is connected at its other end into heat exchanger 37b (located in the position illustrated in FIG. 1) through bypass 50b at a predetermined point along torque tube 20b. The otherwise free end of exchanger 37b is interconnected to the previously recited rotary transfer system by means of an exit tube 46b.

The torque-tube heat exchangers 36a, 37b are connected, for example, to opposite sides of shield 38. The torque-tube heat exchangers 36b, 37a may be identical to exchangers 36a, 37b, respectively. Accordingly, exchanger 36b is positioned concentrically within and against the internal surface of torque tube 20b from its cryogenic end 40b towards its drive end 42b (stopping short of exchanger 37b) and is connected to the inner zone of rotor 12 and one end of shield 38 by conduit 44b and bypass 48b, respectively. Exchanger 37a is connected to exchanger 36b by the shield at bypass 50b and is also connected to the previously recited rotary transfer system by outlet 46a.

During operation of the generator, helium gas within the inner zone of rotor 12 respectively passes through tubes 44a and 44b, into and through their interconnected torque-tube heat exchangers 36a, 36b; into and through shield 38 (as will be described) by means of bypass 48a and bypass 48b; into torque-tube heat exchangers 37b, 37a through bypasses 50b, 50a; and finally to the end of these latter torque-tube heat exchangers where it is directed out through outlet conduits 46b, 46a.

Figure 2:
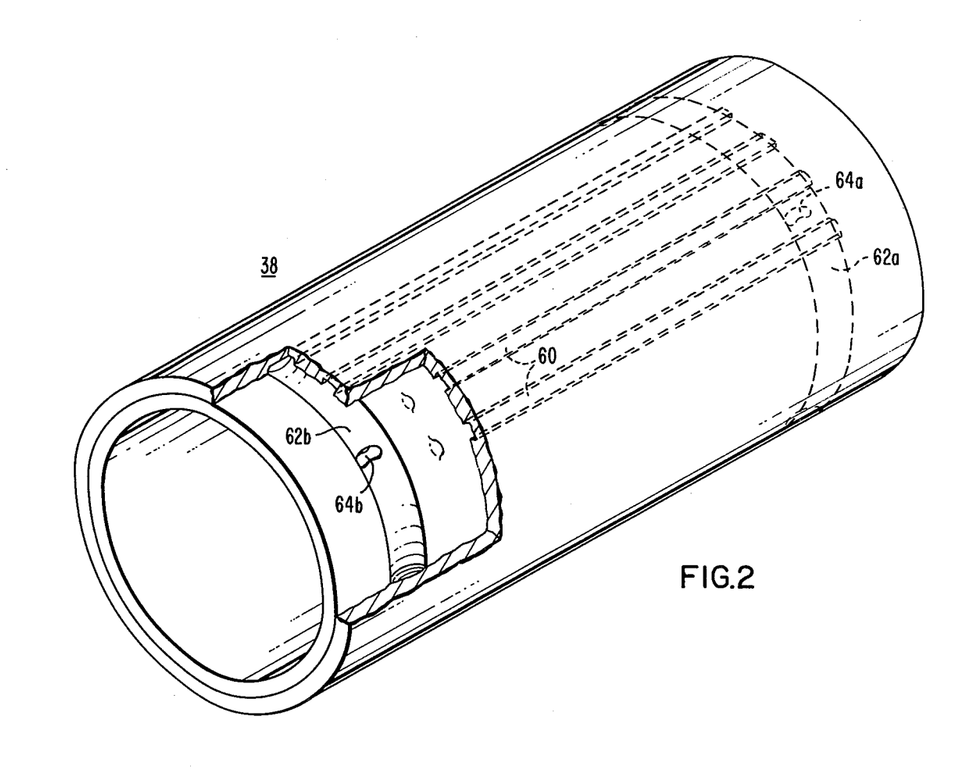
FIG. 2 is a perspective view of a thermal radiation shield comprising part of the generator illustrated in FIG. 1.

FIG. 2 illustrates the coolant-flow scheme for the radiation shield 38 which includes a plurality of internal axially-directed or-extending passages 60, which may, for example, be separated into a plurality of circumferentially-spaced subgroups, each of which is interconnected by a section 62a and a section 62b of circumferentially-extending cross-channels located near opposite ends of the shield. Radially-directed through-holes 64a, 64b extend through the inner surface of the shield 38 in fluid communication with sections 62a, 62b, respectively. These through-holes 64a, 64b are connected with previously described bypass tubes 48a, 50a and 48b, 50b for passing helium gas internally through and in contact with the shield 38. More specifically, the helium flows into bypass 48a passes through the shield 38 (through one subgroup of passages 60) and out bypass 50b. At the same time helium is directed into bypass 48b, passes through the shield 38 and out bypass 50a (through another subgroup of passages 60). Obviously, the helium gas could be passed through still other subgroups of passages using common manifolds.

The number and size of these internal passageways and channels gives them the capacity to pass relatively high surges of helium gas, during abnormal operating conditions, such as the extraordinarily high flow rates often associated with line faults. Equally important for the understanding of the invention, the passageways also allow the shield 38 to transfer its thermal energy to the helium streams, and thus prevent a sudden and abnormal drop in temperature of the coolant. One skilled in the art would identify the shield of this application as being a highly effective regenerator.

THE REGENERATOR

Figure 3:
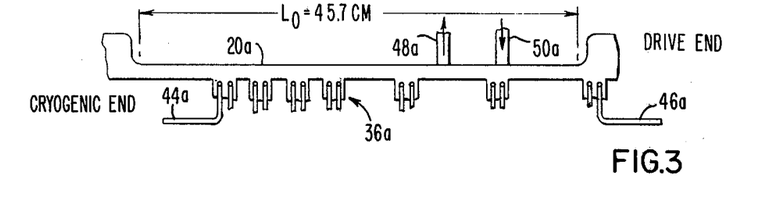
FIG. 3 is a schematic illustration of one torque tube, and associated torque tube heat exchanger, comprising part of the generator illustrated in FIG. 1.

To better understand this process, attention is now directed to FIG. 3 for discussion of the temperature distribution across one of the torque tubes, for example, torque tube 20a. For purposes of description, the torque tube 20a has been separated into seven stations starting with station No. 1 near the cryogenic end of the torque tube 20a and ending with station No. 7 at the room temperature drive end. The cryogenic end of the torque tube heat exchanger 36a, that is, the end connected to connecting conduit 44a, initially makes two very close turns at station No. 1 and thereafter takes successive double turns at spaced-apart stations Nos. 2, 3, 4 and 5 where it is then interconnected to bypass 48a (actually slightly to the right of station No. 5 in the drawings), where the helium gas is passed into radiation shield 38. However, helium from the shield 38 is passed back into the torque tube heat exchanger 36a at station No. 6 through bypass 50a where the torque tube heat exchanger makes two closely spaced turns and thereafter extends over to station No. 7 where it makes two final turns before it is interconnected to outlet tube 46a.

Several points are worthy to note. First, it should be apparent that there is a specific pattern between the various stations Nos. 1 to 7. This pattern along with the flow rate of helium through the exchangers determines the temperature distribution across the torque tube. Second, it should be noted that two closely spaced turns of torque tube heat exchangers have been provided at each station. It is to be understood that the present invention is not limited to this particular configuration. In fact, each station could include only one such turn or it could include any reasonable and practical number of closely spaced-apart isothermal turns (all at the same temperature) depending upon the desired temperature distribution. One final point worthy of noting at this time is that the helium exiting the torque-tube heat exchanger 36a through bypass 48a and entering the shield 38 is not the same helium which enters the torque-tube heat exchanger 37a through bypass 50a from the shield. Rather, as stated previously, the helium entering exchanger 36a at station No. 6 is the helium which left torque-tube heat exchanger 36b at its station on No. 5 (from its bypass 48b). This allows the helium after leaving one torque-tube heat exchanger to pass once entirely across the axial length of the shield 38 before returning to the other torque-tube heat exchanger. Of course, it could be possible to return the helium to the same station after passing it into and through the radiation shield 38.

As stated previously, one purpose for the torque-tube heat exchangers and the interconnected thermal radiation shield is to prevent damage to the torque tubes in the event of a surge in helium gas which would cause a significant drop in temperature across the torque tubes. This is accomplished by controlling the temperature distribution across the torque tubes. Specifically, predetermined axial sections of the torque tubes are maintained at or below the predetermined cryogenic temperature of the torque tubes, for example at or below 100° K., during normal operation of the generator. This minimizes thermal expansion of the sections and damage therefrom in the event of abnormally high surges in helium through the torque tube heat exchangers. At the same time, the remaining sections are maintained at a second temperature above the critical cryogenic temperature during normal operation and heat is applied to these sections from an outside source, specifically the radiation shield. In other words, the temperature of these remaining sections are tied to the temperature of the shield which, as will be seen, resists any temperature drop in this section.

Figure 4:
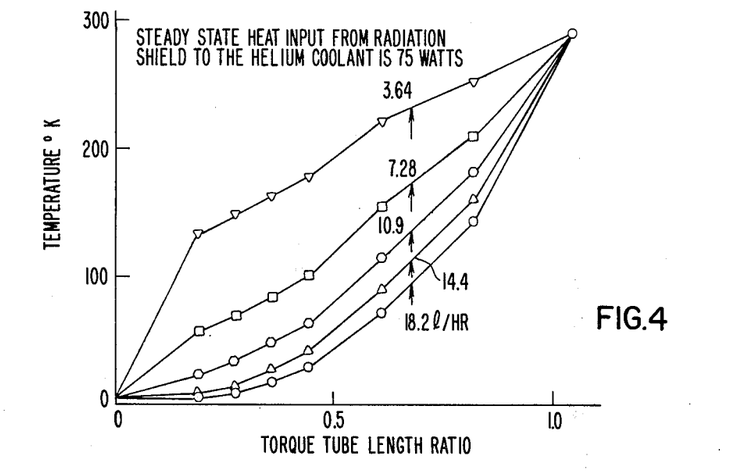
FIG. 4 is a graph illustrating the temperature distribution in degrees Kelvin along the length of the torque tube illustrated in FIG. 3 during normal operation of the generator for a number of different flow rates of helium through the associated torque tube heat exchanger shown in detail in FIG. 3.
Figure 5:
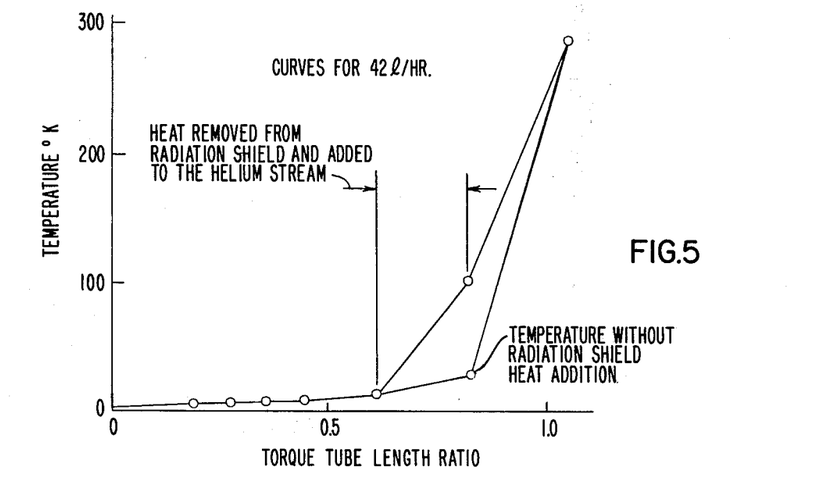
FIG. 5 is a graph similar to FIG. 4 and illustrating the temperature distribution of the torque tube of FIG. 3 for a single helium flow rate during abnormal operation of the generator, for example during a line fault.

In order to more fully explain the temperature distribution just described, attention is directed to the graphs illustrated in FIGS. 4 and 5. Turning specifically to FIG. 4, the temperature distribution in degrees Kelvin across the length of torque tube 20a have been plotted for five different flow rates of helium gas through the torque tube heat exchanger, based on a steady state heat input from the radiation shield to the helium of 75 watts. It should be quite apparent from these different curves that the temperature distribution across the torque tube is affected in a significant way by the particular helium flow rate. For example, at station No. 1, the temperature of the torque tube for a flow rate of 3.64 liters per hour (L/Hr) is approximately 130° K., whereas the flow rate of 14.4 L/Hr and 18.2 L/Hr provide a substantially lower temperature at station No. 1 of about 0° K.

Torque tubes 20a and 20b are constructed of material, for example, selected from the group consisting of steel, nickel and chromium. These materials have a thermal coefficient of linear expansion which is negligible at a temperature at or below approximately 100° K. In comparing the various distribution curves illustrated in FIG. 4 with torque tube 20a illustrated in FIG. 3. It can be seen that the distribution curve for a flow rate of 3.64 L/Hr is clearly outside the requirements of the present invention. Not one of the stations across the length of the torque tube is at or below 100° K. In the next curve, the one resulting from a flow rate of 7.28 L/Hr, while stations Nos. 1 to 4 are at or below 100° K. stations Nos. 5 to 7 are not. While it is true that stations Nos. 6 and 7 are in fact tied to the thermal radiation shield and therefore not to be maintained below 100° K., stations No. 5 is not. Accordingly, if this latter station is not maintained at or below approximately 100° K. it will expand significantly if subjected to a significant drop in temperature. Such expansion could result in damage to the torque tube under certain conditions. The distribution curve represented by the 7.28 L/Hr flow rate therefore does not meet the requirements of the present invention.

The remaining three curves do meet the requirements of the present invention. From FIG. 4 it can be seen that, during normal operation of the generator, all of the stations Nos. 1 to 5, that is, the stations of the torque tube from its cryogenic end to exchanger 37a, are maintained at or below 100° K. In this regard, the curve represented by the 10.9 L/Hr flow rate may be questionable, since the point (indicated by the arrow) between the exchangers 36a and 37a is slightly above 100° K. whereas those points in the last two curves are clearly at or below 100° K.

From the point where the helium gas is bypassed into the shield to the point where it is returned to the shield, the temperature rises somewhat, reaching the temperature of the shield in the vicinity of station No. 6 (the point of entry of the helium from the shield). From this general vicinity all the way to the driving end of the torque tube its temperature rises.

The various temperature distribution curves just described represent temperature across torque tubes 20a and 20b during normal operation of the generator. However, during a three-phase high voltage transmission line fault, or for any other reasons should the helium flow rate increase drastically, there is a tendency for a significant drop in temperature across the torque tubes, especially if not controlled. In FIG. 5 a temperature distribution curve is given for this abnormal operation. The rate of change of temperature with axial distance between stations Nos. 6 and 7 of this curve compares favorably to the 18.2 L/Hr flow rate referred to previously, and represents a satisfactory thermal stress level. However, during this abnormal operation, it can be seen that the torque tube from its cryogenic end to station No. 5 has dropped significantly in temperature. Because this section was initially maintained at temperatures at or below 100° K., the drop in temperature did not subject it to any appreciable thermal stress. On the other hand, it can be seen that the section between station No. 5 and station No. 7 did not drop significantly in temperature. This is because of the transfer of heat to this section from the radiation shield by means of the helium gas. In other words, even though the increase in helium flow rate through the radiation shield and exchanger 37a between stations Nos. 5 and 7 has a tendency to decrease the temperature of the shield and corresponding torque tube section, the shield acts as a relatively large heat source because of its thermal inertia, and will not drop in temperature significantly. Moreover, where the abnormal operation is a result of a line fault of the aforedescribed type, the electromagnetic field resulting from such a fault will actually heat the shield to a temperature higher than its normal temperature, thereby contributing even more heat to the helium gas. From the foregoing, it should be apparent that the present invention is based upon a particular temperature distribution across the torque tubes. It is to be understood that one with ordinary skill in the art, based on the teachings disclosed herein could readily determine a particular helium flow rate and torque tube heat exchanger configuration necessary to provide the appropriate temperature distribution to meet the requirements set forth herein.

EXAMPLE OF DESIGN AND OPERATING CONDITIONS

Having described the generator and the manner in which it operates, both normally and abnormally, attention is directed to a specific example. In this example, the rotor design is one which has a normal helium flow rate of 10.9 liters per hour, as illustrated in FIG. 4. For this rotor a 66 microsecond line fault causes a heat input of 21,000 joules which boils-off approximately 3.8 liters of helium per end (per torque tube). The resulting helium flow rate rises to 456 liters per hour (for 30 seconds). Analysis shows that the thermal stress reaches the design limit at approximately 20 liters per hour (for the design herein considered). The heat capacity of the fault induced helium stream is 4.9 KJ/°K.; and the capacity of the torque tube, by comparison, is negligible. However, the heat capacity of the radiation shield for the present design is 46 KJ/°K. If the heat content of the shield is fully available to the helium stream, the stream could be raised approximately 100° K. for a 10° K. temperature drop in the shield. Because heat must be conducted to the cooling passages in the radiation shield, and a temperature drop exists in the helium at the duct wall, all of the heat content at the shield is not available to the helium. Application of the usual periodic heat exchanger equations to the shield indicates a thermal approach of about 15° K. Adding this temperature to a 5° K. drop in shield temperature indicates the helium will return to the torque tube at station No. 6 at about 100° K. if the radiation shield normally operates at 120° K. average temperature. Note that so far the analysis has not accounted for electromagnetic heating of a radiation shield during the 66 microsecond fault. During the fault 5 KJ of energy is generated in the radiation shield which tends to aid in the helium warming function, even if only slightly. FIG. 4 shows the torque tube temperature distribution to be similar to the steady-state distribution above 100° K. but radically altered below 100° K. The steep gradients below 100° K. result in very little stress because the coefficient of linear expansion of steel, nickel and chromium are miniscule below 100° K. as stated previously. Thus, the novel torque tube exchanger and radiation shield cooling methodology protects the torque tube from extreme thermal stresses. Moreover, the preheated helium when passing through the rotary transfer system upon exiting the generator protects the system's seals which cannot operate below 280° K.

FLOW STABILIZATION IN THE SHIELD

It should now be quite apparent that this invention particularly concerns, inter alia, the coolant flow through the axial passages 60.

However, fluid flow at cryogenic temperatures through such parallel cooling tubes is known to exhibit thermo-hydraulic instabilities. These highly undesirable instabilities must be avoided.

Theoretically, the instabilities occur because the channel or passage pressure-drop along its length is proportional to temperature to the 1.65 power, i.e., $$\Delta_p \sim T^{1.65} \tag{1}$$

Furthermore, viscosity of the fluid is a function of temperature; varying directly with the temperature. It can, therefore, be understood that the pressure-drop across each of the axial passages is directly proportional to the viscosity of the fluid. Thus any decrease in fluid temperature produces a decrease in channel pressure-drop which, in turn, increases the channel flow rate. For example, if any particular axial passage begins to run slightly colder than the other channels, the viscosity of the coolant is decreased relative to the other channels, and its pressure-drop goes down, enabling it to handle a higher flow rate. An increase in the flow rate through the channel would be at the expense of the flow through others of the axial channels. That increase of flow volume of the supercooled fluid further reduces the channel's temperature, and establishes an instable flow outrush through the channel. Under certain operating conditions the instability can approach a runaway situation, or in the least inhibit the shield from functioning as a regenerator.

In accordance with the invention, flow stabilization is achieved through incorporation of a flow dam or riser at the discharge end of each of the axial passages 60. The riser, or flow dam, causes a change in radial position of the flow, and a stabilizing density stratification.

Figure 6A:
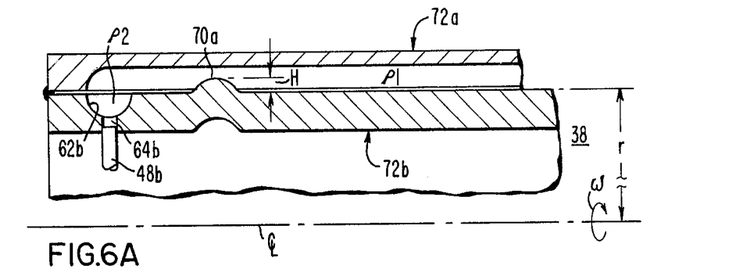
FIGS. 6A through 6C are detailed sectional views of the discharge end of the radiation shield, showing alternative flow regulators constructed in accordance with the invention.
Figure 6B:
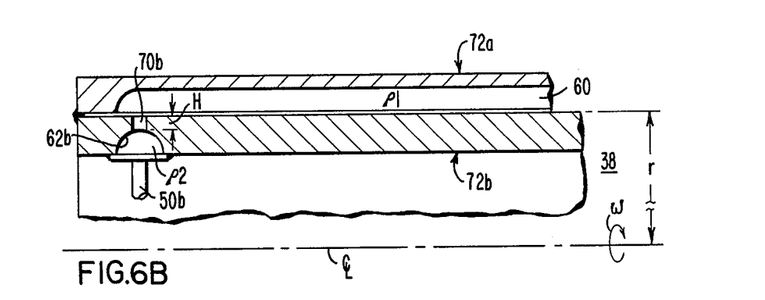
Figure 6C:
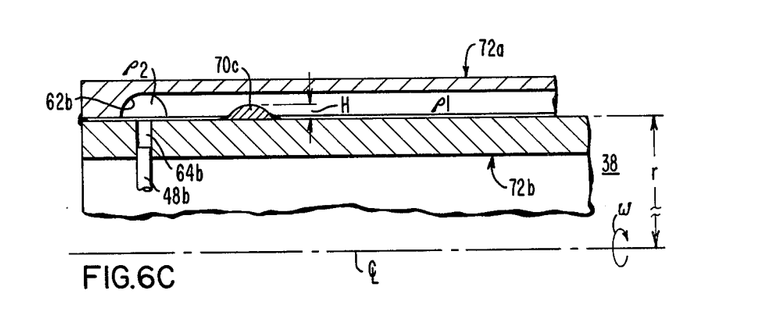

Attention is directed to FIGS. 6A, 6B and 6C for detailed views of a generator's radiation shield 38. These figures illustrate three embodiments incorporating alternative means for flow stabilization. It can be seen in these figures that the radiation shield 38 is comprised of two coaxial, cylindroid plates 72a and 72b having a plurality of axial passages 60 therebetween. Preferably, the axial passages 60 are disposed on the radially inward surface of the outer plate 72a, for example manufactured by machining into said surface. As can be seen from the drawings, the radiation shield also includes the aforesaid sections of circumferentially-extending cross-channels 62a,b.

As was described above, the flow path through the shield 38 is as follows: from the rotor through bypass 48a, 50a to the shield 38, into and through the circumferential channel 62a, through axial passages 60, to and through circumferential channel 62b, and back to the rotor via bypass 48b or 50b. In this flow path, circumferential channel 62a acts as an entry channel to the axial passages 60 while circumferential channel 62b at the opposite end of the radiation shield 38 acts as an exit cross-channel from the axial passages 60. Thus the flow through the axial passages 60 extends from one end of the shield 38 in the direction of the opposite or discharge end. This is but one example of the many possible flow paths. The invention embraces other possibilities such as U-shaped flow channels in which the coolant enters and exits from the same side of the radiation shield 38, or even S-shaped channels. The thermohydraulic design hereinafter discussed would have to be modified to incorporate either of these designs, but it should be understood that one skilled in this art would have no trouble in so doing.

Now specifically discussing FIG. 6A, a first alternative embodiment for the flow stabilization configuration is illustrated. The riser 70a is disposed within each of the axial passages 60 at the discharge end of the shield 38. For example, the riser 70a may be manufactured as by peening from the radially inward surface of the inner plate 72b, so that it is located a short distance from the discharge circumferential channel 62b. As shown, the circumferential channel 62b is located in fluid communication with the axial passages 60, disposed on the radially-outward surface of the inner plate 72b. Parenthetically, it should be observed that the axial passages 60 extend a slight distance beyond the circumferential channel 62b in an axial direction. This design takes into account tolerance considerations which may develop during assembly of the radiation shield 38. For example, one possible way of making the shield 38 is to heat-shrink the plates 72a and 72b together in assembled form. The slight overlap of the axial passages 60 in relation to the circumferential channel 62b accommodates thermal expansion which might otherwise affect the assembly operation.

FIG. 6B shows a second alternative embodiment for the stabilizing means configuration. In this case, flow stabilization is achieved through the use of circumferentially spaced-apart, radially-directed passages 70b, each of which interconnects one of the axial passages 60 with the circumferential channel 62b. Note in this figure the discharge circumferential channel 62b is disposed in the radially-inward surface of the inner shield plate 72b. For example, the circumferential channel 62b is machined into this surface and the radial passages 70b are drilled. It is important to keep in mind for later discussion that the height of the riser in this embodiment is the extent or distance of these passages 70b in the radial direction as indicated in the drawing.

In FIG. 6C a variation on the embodiment shown in FIG. 6A is illustrated. In this drawing flow stabilization is achieved through the use of a protuberance 70c which is fixedly attached, as by welding for example, to the radially-outward surface of the inner plate 72b. As a variation on the design, the discharge circumferential channel 62b is shown as disposed in the radially-inward surface of the outer plate 72a. As in the embodiment shown in FIG. 6A, the radial through-hole 64b provides the necessary hydraulic interconnection between the circumferential channel 62b and bypass 48b. Likewise similar to the first embodiment, the height "H" for purposes of the equations given below is the height in the radial direction from the bottom to the top of the riser 70a and 70c.

In each of these cases, the flow stabilization device 70a,b,c can be visualized as operating similar to a centrifugal separator. Each of the axial passages 60 is at an equal radial distance from the centerline of the rotor. During rotation, they are subjected to a relatively high centrifugal force, for example in the order of 5,000 g's. The warmer fluid will more readily move through the axial passages 60 (and over or through the riser 70a,b,c) than will the colder fluid. The colder fluid will be held radially inward, its flow inhibited by the riser 70a–c. The colder fluid thus stays within the radiation shield 38 for a longer period of time and is therefore heated by the warmer radiation shield 38.

The mathematical equations governing the design and operation of the riser 70a,b,c will assist in the understanding of the device. The inclusion of a riser having an associated height "H" will stabilize the flow according to the following pressure-balanced equation. The attached table identifies the symbols used, some of which also appear in the FIGS. 6A–C. The pressure rise across the riser 70a,b,c in a cold channel is:

$$\Delta p = p_1 - p_2 \qquad (2)$$

$$\Delta p = \frac{(\Delta \rho) r \omega^2 h}{2 g_c} \qquad (3)$$

The change of pressure across a channel (compared to a uniform, warm channel) is:

$$\Delta p = \frac{8f}{\pi^2 g_c} \frac{l}{d^5} \frac{\Delta \rho m^2}{\rho^2} \quad (4)$$

Combining the above equations yields the following equation for the desired height "H":

$$h \geq \frac{16}{\pi^2} \frac{f l \dot{m}^2}{\rho^2 r \omega^2 d^5 g_c} \quad (5)$$

This is the height of the riser 70a,b,c required for stabilization of the flow. For example, a typical height would be 0.005 inches for the above-described generator. Of course, the riser's height may be increased to accommodate manufacturing tolerances. Note that this height is sized for the largest density difference in the helium that is likely to occur.

TABLE OF SYMBOLS d = diameter of axial passage
f = friction factor
$g_c$ = gravitational constant
h = height of riser
l = length of axial passage
m = mass flow rate of channel
$\Delta p$ = pressure drop
r = average distance from generator center-line to mid-point of riser
$\rho$ = fluid density
$\omega$ = angular speed of rotor.

It will now be apparent that a superconducting generator with improved thermal transient response has been provided and disclosed. In particular, the radiation shield is given the twin-functions of protecting the rotor from radiated heat from the ambience, as well as warming the coolant to ensure minimal damage during abnormal operating conditions. Thermohydraulic stabilization of the flow through the axial passages in the shield is achieved by the use of risers located within the flow path at the discharge end of the shield.

We claim:

1. A superconducting generator with improved thermal transient response, comprising:
   a rotor assembly including a winding, a cylindrical support structure for supporting said winding, and a torque tube at each end of said rotor assembly for transmitting torque thereto;
   each of said torque tubes being a cylindroid having along its inner circumferential surface a heat exchanger attached thereto and comprising a plurality of tubes for directing coolant;
   a radiation shield disposed cylindrically about and in close proximity to said rotor assembly, said radiation shield acting to intercept radiant heat from the ambience;
   said radiation shield having therein a plurality of axial passages for directing a coolant through the shield;
   means for directing said coolant from each of said heat exchangers into said shield's coolant passages;
   means for discharging said coolant from said shield to a preselected one of said heat exchangers; and
   means disposed in the coolant passages before the discharging means for regulating a flow of fluid from each of the axial passages to ensure substantially equal flow rates through each of the axial passages.

2. The generator of claim 1 wherein the regulating means stabilizes the flow from the axial passages and whereby the temperature and flow rate through any of the passages does not vary substantially from that of the other passages.

3. The generator of claim 1 wherein the regulating means is a protuberance disposed within each axial passage near said discharging means of the radiation shield, said protuberance having a predetermined height which establishes a predetermined flow and temperature characteristic of said coolant.

4. The generator of claim 3 wherein axial pipes are disposed generally parallel to one another and circumferentially-spaced about the cylindrical shield.

5. The generator of claim 1 further comprising a plurality of radially-extending passages;
   each of said axial passages connected to said discharging means by one of said radially-extending passages, said radially-extending passages having a predetermined height in the radial direction which establishes a predetermined flow and temperature characteristic of the coolant through each axial passage.

6. The generator of claims 3 or 5 wherein the discharging means includes a circumferentially directed passage disposed within said shield;
   said passage interconnecting each of said axial passages.

7. The generator of claim 6 wherein the radiation shield comprises an outer cylindrical plate, and an inner cylindrical plate fixedly attached to, and concentric with, said outer plate; and
   wherein said coolant passages are machined into the surfaces between the plates.

8. The generator of claim 3 wherein the axial passages are machined into the radially-inward surface of said outer plate and the protuberance and the circumferential passage are disposed in the inner plate.

9. The generator of claim 3 wherein the protuberance is machined by peening from the radially-inward side of the radiation shield.

10. The generator of claim 3 wherein the protuberance is welded into the radially-outward surface of said inner plate.

11. In a superconducting generator including a rotor assembly which is supercooled by means of helium, first and second torque tubes connected with said assembly and constructed of a material having a coefficient of linear thermal expansion which is negligible at or below a predetermined cryogenic temperature, and a thermal radiation shield positioned adjacent to but outside said assembly, a method of cooling a preselected one of said torque tubes comprising:
   (a) directing continuous streams of helium adjacent to and along predetermined sections of said torque tubes at a predetermined flow rate during normal operation of said generator for maintaining said sections at temperatures at or below a predetermined cryogenic temperatures during said normal operation;
   (b) directing said streams of helium from said predetermined torque tube sections to and in direct contact with said radiation shield;
   (c) directing said streams of helium through a plurality of channels in said radiation shield;

(d) immediately before discharging said streams from said shield, regulating the flow of helium through each of said channels by means of a riser disposed in said channels; whereby said riser prevents the helium from discharging from any particular channel at a flow rate substantially different from the rate through the other channels;

(e) discharging said streams of helium from said shield to the remaining sections of said torque tubes for maintaining said remaining sections at temperatures at or above the temperature of said shield; and (f) thereby minimizing thermal expansion of said torque tubes, and damage therefrom, in the event said generator experiences abnormal operation such as a line fault.

12. A superconducting generator with improved thermal transient response, comprising:
 (a) a rotor assembly adapted to be supercooled, said assembly including
   (i) a superconducting field winding, and
   (ii) cylindrical means for supporting said winding;
 (b) first and second cylindrical torque tubes respectively connected at their ends to opposite ends of said cylindrical supporting means and extending coaxial therewith, said torque tubes each being constructed of a material having a thermal coefficient of linear expansion which is negligible at and below a predetermined cryogenic temperature;
 (c) means for supercooling said rotor assembly during normal operation of said generator;
 (d) a thermal radiation shield adjacent to and outside said rotor assembly;
 (e) said shield having internal passage means adapted to pass helium therethrough, said means including a plurality of axially-directed passages, an inlet peripherally-extending channel, a discharge peripherally-extending channel, and means for regulating a flow of said helium through the passages, said regulating means including a riser;
 (f) means for directing continuous streams of coolant at a predetermined flow rate adjacent to predetermined first axial sections of said torque tubes for maintaining the temperature of said sections at or below a predetermined cryogenic temperature;
 (g) means for directing said streams from said first torque tube sections to said shield; and
 (h) means for discharging said streams of helium from said shield to predetermined second sections of said torque tubes for transferring heat from said shield to said second sections and thereby maintaining their temperatures at or above said predetermined cryogenic temperature during said normal operation, the transfer of heat minimizing any drop in temperature of said second torque tube sections in the event of abnormal operation.

13. The supercooled generator according to claim 12 wherein said predetermined cryogenic temperature is about 100° K.; and
 each of said torque tubes is constructed of a material selected from the group consisting of steel, nickel, and chromium.

14. The superconducting generator according to claim 12 wherein the riser is a protuberance located in each and every axial passage, at its end closest to the discharging means.

15. The superconducting generator according to claim 12 wherein the regulating means includes a plurality of radially-directed passages and each of said axial passages is hydraulically interconnected with said discharge peripheral channel through one of said radial passages, each of said passages acting to regulate the flow therethrough.

* * * * *